United States Patent Office 3,435,913
Patented Apr. 1, 1969

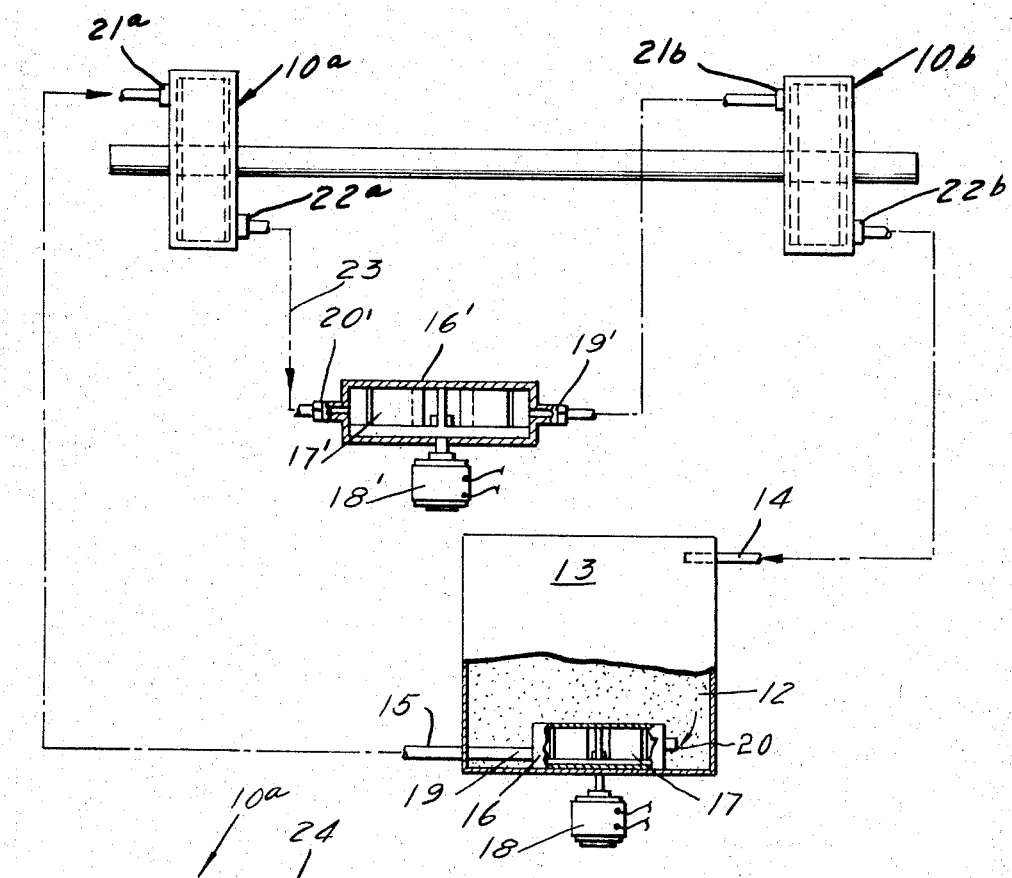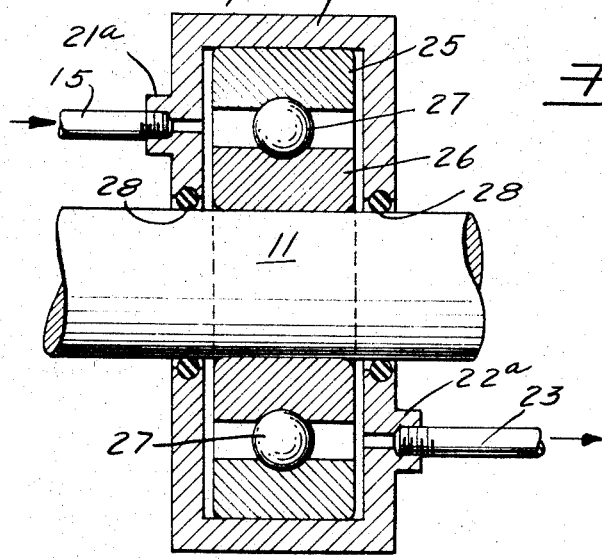

3,435,913
HIGH-SPEED BEARING LUBRICATOR
George J. Driver, Jr., 1265 Crestridge Place,
Anaheim, Calif. 92805
Filed July 12, 1965, Ser. No. 471,350
Int. Cl. F16n *17/06;* F01m *1/00*
U.S. Cl. 184—6          6 Claims

ABSTRACT OF THE DISCLOSURE

A high-speed bearing lubricator which includes a closed system for circulating solid lubricant particles in a gas carrier to a sealed housing for the bearing, the carrier and lubricant being delivered from a pump under positive pressure to an inlet of the bearing housing and returned to the pump by a suction pressure applied to an outlet of the bearing housing, a closed mixing container being interposed in the return line which is connected at the top of the container for mixing and agitating the carrier and particles prior to reaching the inlet of the pump which is contained within the container and has its inlet at the bottom thereof. Where several bearings are lubricated in series, pumping means are placed in flow paths between the successive bearings so as to apply pressure to the inlet side of the bearing housing and suction to the outlet side of each bearing housing.

---

The present invention relates generally to the art of lubricating moving parts, and is more particularly concerned with improvements in the means for lubricating anti-friction bearings which are required to operate at relatively high speeds and at relatively high temperatures.

Investigations in this field have indicated that the use of lubricating powders entrained in a gas carrier might provide a solution to the problem of high speed, high temperature lubrication, providing a satisfactory means could be found to assure a continuous and uninterrupted circulation of such a medium through the bearing parts.

The usual means, as utilized with a liquid lubricant, are not successful in the case of a gas having an entrained powdered lubricant therein. It has been found that in attempts to utilize conventional means as just mentioned, there is a tendency for the powder to pile up or clog the bearing. Such a condition results when it is endeavored to supply the powdered material to the bearing under a condition in which the gas carrier is under pressure.

Having the foregoing in mind, the present invention in its broad concepts has for an object the provision of improved means for setting up a positive circulation through anti-friction high-speed bearings of a gas carrier having an entrained powdered lubricant therein.

A further object is to provide an improved lubricating system wherein a gas carrier having an entrained lubricating powder can be circulated and moved through an anti-friction bearing such as ball bearings or the like, and which will lubricate the bearing when operating at relatively high speeds and temperatures.

Another object of the invention is to provide high-speed bearing lubricating means in which a gas carrier having an entrained lubricating powder therein can be supplied to and removed from the bearing, and in which the lubricating medium will be mixed and agitated during its movement.

Still another object is to provide high-speed bearing lubricating means, wherein it is possible to utilize a gas carrier and one or more dry lubricants, such as molybdenum disulfide and phthalocyanine entrained in nitrogen, or graphite singly or mixed with cadmium oxide which may be entrained in an air carrier.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a view diagrammatically illustrating a lubricating arrangement embodying the features of the present invention; and FIG. 2 is a diametric section through a bearing structure as utilized in the present invention.

Referring more specifically to the drawings, the high-speed bearing lubricator means according to the present invention is disclosed in FIG. 1 as being applied to bearings 10a and 10b which rotatably support an elongate shaft 11. The invention is particularly concerned with the lubrication of bearings in connection with a shaft which may operate at speeds of the order of, for example, 50,000 to 65,000 r.p.m. Moreover the invention is also concerned with bearings which may be required to operate at relatively high temperatures, for example, of the order of 1,000–1,500° F. Conventional organic lubricating materials become unstable at the higher temperatures and are otherwise unreliable at such high speeds.

Investigations which have been made on the use of lubricating powders entrained in a gas carrier have indicated promising results. Such mixtures may comprise one or more powdered lubricants mixed with a carrier gas, and exemplary of such mixtures are molybdenum disulfide and phthalocyanine which are entrained in nitrogen. Another mixture which has given successful results as a lubricating medium comprise graphite and cadmium oxide carried in air. The main problem in attempting to utilize such mixtures consists in the finding of the practical means by which the mixture can be circulated through the bearing structure with an appreciable lubricant flow rate over extended time periods without piling up or clogging in the bearing.

In the present invention, this problem has been solved by an arrangement in which the lubricating medium is supplied to the bearing structure inlet under pressure and removed from the outlet of the bearing by suction.

As more clearly shown in FIG. 1, the mixture of powdered lubricant with a gas carrier as indicated at 12 is placed within a closed sealed tank or container 13 which is provided with an inlet connection at the top thereof for a return conduit 14. Adjacent the bottom of the tank 13 there is an outlet connection with an outlet conduit 15.

For supplying the lubricating medium from the tank to the outlet conduit 15 under increased pressure, which may be of the order of 5 p.s.i., there is provided a pump 16 having a rotatable impeller or vane type rotor 17 therein and which is driven by suitable power means such as an electric motor 18. This electric motor is shown as being exteriorly of the tank 13. However, it is to be understood that this motor may be mounted within the tank together with the pumping structure as a unit. The pump has an outlet 19 which is connected with the outlet conduit 15, and an inlet 20 which is in communication with the tank interior so as to receive lubricating medium therefrom. By having the pump inlet adjacent the bottom of the tank 13, and the return conduit 14 at the top of the tank 13, the tank provides a mixing chamber wherein the returning lubricating medium will be mixed and agitated prior to its entering the pump 16, wherein further agitation of the lubricating medium will be accomplished prior to delivery to the outlet conduit 15.

The outlet conduit 15 is connected with an inlet connection 21a of the bearing structure 10a. This bearing has an outlet connection 22a which connects through a conduit 23 with an inlet connection 21b of the bearing 10b, this bearing having an outlet connection 22b with the return conduit 14.

In order to provide a suitable suction at the outlet connection 22a of the bearing 10a, and pressure in the lubricating medium supplied to the inlet connection 21b of bearing 10b, there is inserted into conduit 23 a pump 16' which may be of similar construction to that which is utilized in the tank 13. Similar parts of this pump are indicated by corresponding numerals which are primed.

With the above arrangement, a closed system is provided wherein the lubricating medium will be circulated through the bearings 10a and 10b, the lubricating medium being supplied to the bearing inlets in each case under pressure, and removed from the bearing outlets by the application of suction. Piling up or clogging of the lubricating medium within the bearing structures is thus prevented. Operation of the system is enhanced by the mixing functions performed by the pumps 16 and 16', and the manner of returning and withdrawing the lubricating medium with respect to the tank 13.

The high-speed bearing lubricator arrangement as disclosed herein has been illustrated as being used with high speed anti-friction bearings of the ball-bearing type of conventional construction such as illustrated in FIG. 2. The bearing structure, in this case the bearing 10a, comprises a housing 24 within which there is assembled a ball bearing structure which includes an outer race 25, an inner race 26 secured to the shaft 11, and the ball bearings therebetween as indicated at 27. The sides of the housing may be sealed with respect to the shaft 11 by sealing members which have been shown in this case as O-rings 28—28. By placing the inlet connection 21a on one side of the housing and the outlet connection 22a on the opposite side, the lubricating medium must pass through the anti-friction bearing parts during its travel from the inlet connection to the outlet connection thereof.

Various modifications may suggest themselves to those skilled in the art without departing from the spirit of my invention, and, hence, I do not wish to be restricted to the specific form shown or uses mentioned, except to the extent indicated in the appended claims.

I claim:

1. Closed circuit lubricating means for applying solid lubricant particles to a high-speed bearing, comprising:
   (a) pumping means for a gas fluid carrier containing an entrained powdered lubricant, said pumping means having an outlet connected to supply the carrier and powdered lubricant at an increased pressure to the bearing, and an inlet connected to apply reduced pressure to the bearing to augment flow of said carrier and powdered lubricant through the bearing, and the return thereof to the pumping means; and
   (b) a closed container for receiving and mixing the carrier and entrained powdered lubricant returned from said bearing prior to entering the pumping means inlet.

2. Closed circuit lubricating means for applying solid lubricant particles to a high-speed bearing, comprising:
   (a) pumping means for a gas carrier such as nitrogen containing a mixture of entrained powdered lubricants such as molybdenum disulfide and phthalocyanine, said pumping means having an outlet connected to supply the carrier and powdered lubricants at an increased pressure to the bearing, and an inlet connected to apply reduced pressure to the bearing to augment flow of said carrier and powdered lubricants through the bearing, and the return thereof to the pumping means; and
   (b) a closed container for receiving and mixing the carrier and entrained powdered lubricants returned from said bearing prior to entering the pumping means inlet, said container having a connection for receiving the returned lubricants at its upper end, and a connection at its lower end for returning the lubricants to the pumping means.

3. Closed circuit lubricating means for applying solid lubricant particles to a high-speed bearing, comprising:
   (a) pumping means for a gas carrier such as air containing a mixture entrained powdered lubricants such as graphite and cadmium oxide, said pumping means having an outlet connected to supply the carrier and powdered lubricants at an increased pressure to the bearing, and an inlet connected to apply reduced pressure to the bearing to augment flow of said carrier and powdered lubricants through the bearing, and the return thereof to the pumping means; and
   (b) a closed container for receiving and mixing the carrier and entrained powdered lubricants returned from said bearing prior to entering the pumping means inlet, said pumping means being contained within said container and having its inlet at the bottom of the container.

4. Closed circuit lubricating means for applying solid lubricant particles to a high-speed roller bearing, comprising:
   (a) pumping means for a gas fluid carrier containing a mixture of a plurality of entrained powdered lubricants, said pumping means having an outlet connected to supply the carrier and powdered lubricants at an increased pressure to the bearing, and an inlet connected to apply reduced pressure to the bearing to augment flow of said carrier and powdered lubricants through the bearing, and the return thereof to the pumping means; and
   (b) a closed container for receiving, agitating and mixing the carrier and entrained powdered lubricants reutrned from said bearing prior to entering the pumping means inlet.

5. Closed circuit lubricating means for a plurality of roller bearings operable at high speeds, comprising:
   (a) means connecting said bearings in series and providing a closed circuit flow path for a gas fluid carrier containing an entrained powdered lubricant;
   (b) fluid pumping devices respectively in the flow path between the successive bearings, each of said pumping devices having an outlet connected to the adjacent downstream bearing, and an inlet connected to the adjacent upstream bearing; and
   (c) a closed container in the flow path between two of said bearings for receiving and mixing the carrier and entrained powdered lubricant returned from the adjacent upstream bearing prior to entering the associated pumping means inlet.

6. Closed circuit lubricating means for a plurality of roller bearings operable at high speeds, comprising:
   (a) means providing a closed circuit flow path for serially conducting through said bearings a gas fluid carrier containing an entrained powdered lubricant;
   (b) fluid pumping devices respectively positioned in the flow path portions between adjacent bearings, each of said pumping devices having an outlet connected to the adjacent downstream bearing, and an inlet connected to the adjacent upstream bearing; and (c) means in one of said flow path portions for receiving and mixing the carrier and entrained powdered lubricant.

References Cited

UNITED STATES PATENTS

| | | | |
|---|---|---|---|
| 3,221,984 | 12/1965 | Ditzler | 184—6 X |
| 3,286,792 | 11/1966 | Wall | 184—6 |
| 2,922,491 | 1/1960 | Macks. | |
| 3,265,617 | 8/1966 | Allen | 252—25 |
| 3,297,572 | 1/1967 | Haltner et al. | 252—25 X |

FOREIGN PATENTS

| | | |
|---|---|---|
| 764,860 | 1/1957 | Great Britain. |
| 853,180 | 11/1960 | Great Britain. |

OTHER REFERENCES

PbO as a Solid Lubricant, in Scientific Lubrication, vol. 9, No. 3, p. 36 of March 1957.

LAVERNE D. GEIGER, *Primary Examiner.*

E. J. EARLS, *Assistant Examiner.*